(12) United States Patent
Epshteyn et al.

(10) Patent No.: US 11,296,346 B2
(45) Date of Patent: Apr. 5, 2022

(54) BOROSULFATE PROTON CONDUCTING MATERIALS

(71) Applicant: The Government of the United States of America, as represented by the Secretary of the Navy, Arlington, VA (US)

(72) Inventors: Albert Epshteyn, College Park, MD (US); Matthew D. Ward, Washington, DC (US); Brian L. Chaloux, Alexandria, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/953,691

(22) Filed: Nov. 20, 2020

(65) Prior Publication Data

US 2021/0159530 A1 May 27, 2021

Related U.S. Application Data

(60) Provisional application No. 62/950,215, filed on Dec. 19, 2019, provisional application No. 62/940,451, filed on Nov. 26, 2019.

(51) Int. Cl.
*H01M 8/1016* (2016.01)
*H01M 8/1004* (2016.01)
*H01M 8/18* (2006.01)

(52) U.S. Cl.
CPC ........ *H01M 8/1016* (2013.01); *H01M 8/1004* (2013.01); *H01M 8/188* (2013.01); *H01M 2300/0068* (2013.01)

(58) Field of Classification Search
CPC ....... H01M 2300/0068; H01M 8/1004; H01M 8/1016; H01M 8/188
See application file for complete search history.

(56) References Cited

FOREIGN PATENT DOCUMENTS

| KR | 10-2031981 | 10/2019 |
|----|------------|---------|
| KR | 10-2038619 | 10/2019 |
| WO | 2018-142716 | 8/2018 |
| WO | 2018-146282 | 8/2018 |

OTHER PUBLICATIONS

Daub, M., Höppe, H.A. and Hillebrecht, H. (2014), Further New Borosulfates: Synthesis, Crystal Structure, and Vibrational Spectra of A[B(SO4)2] (A = Na, K, NH4) and the Crystal Structures of Li5[B(SO4)4] and NH4[B(S2O7)2]. Z. anorg. allg. Chem., 640: 2914-2921. https://doi.org/10.1002/zaac.201400315.

(Continued)

*Primary Examiner* — Sarah A. Slifka
*Assistant Examiner* — Rachel L Zhang
(74) *Attorney, Agent, or Firm* — US Naval Research Laboratory; Roy Roberts

(57) ABSTRACT

Borosulfate salts of protic Brønsted bases, for example $NH_4[B(SO_4)_2]$, can serve as proton conductors in electrochemical devices such as fuel cells, flow batteries, and electrolyzers.

12 Claims, 4 Drawing Sheets

(56) References Cited

OTHER PUBLICATIONS

High-Activity, Durable Oxygen Reduction Electrocatalyst: Nanoscale Composite of Platinum-Tantalum Oxyphosphate on Vulcan Carbon. Yannick Garsany, Albert Epshteyn, Andrew P. Purdy, Karren L. More, and Karen E. Swider-Lyons The Journal of Physical Chemistry Letters 2010 1 (13), 1977-1981 DOI: 10.1021/jz100681g.
International Search Report dated Apr. 28, 2021 in PCT/US2020/061445.
Written Opinion dated Apr. 28, 2021 in PCT/US2020/061445.
Ward, M. D., Chaloux, B. L., Johannes, M. D., Epshteyn, A., "Facile Proton Transport in Ammonium Borosulfate—An Unhumidified Solid Acid Polyelectrolyte for Intermediate Temperatures.\" Adv. Mater. 2020, 32, 2003667. https://doi.org/10.1002/adma.202003667.

BOROSULFATE PROTON CONDUCTING MATERIALS

CROSS-REFERENCE TO RELATED APPLICATIONS

This application claims the benefit of U.S. Provisional Patent Application No. 62/940,451 filed on Nov. 26, 2019 and U.S. Provisional Patent Application No. 62/950,215 filed on Dec. 19, 2019, each of which is incorporated herein by reference in its entirety.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; techtran@nrl.navy.mil, referencing NC 111,923

BACKGROUND

Intermediate temperature hydrogen fuel cells (those operating in approximately the range of 150-300° C., as opposed to <150° C. or >500° C.) could provide a path to overcome a number of the hurdles faced by the more widely used polymer-electrolyte membrane fuel cells (PEM-FCs) that typically operate at temperatures <90° C. One major advantage could be the ability to lower the loading of expensive noble metal catalysts, typically platinum, or to change to a cheaper alternative catalyst entirely. Additionally, PEM-FCs are reliant on humidification systems that significantly increase the size, complexity, and cost of the fuel cell device. Other advantages of running fuel cells at intermediate temperatures as compared to PEM-FCs include better water rejection that avoids catalyst flooding issues and expensive water management, fewer problems from catalyst poisoning due to a higher operating temperature; and in general operating systems at a higher temperature buys greater overall efficiencies. Intermediate temperature fuel cells could also provide significant advantages over another relatively mature fuel cell technology—the solid oxide fuel cells (SOFCs), which generally operate at much higher temperatures of at least 500° C. Here the advantages are in that much less power would be drained from the system in order to sustain the temperatures necessary for operation, and the overall system would require less insulation and therefore would be smaller and lighter, allowing for mobile applications use on small vehicles. Furthermore, much less exotic materials would be necessary to construct hydrogen fuel cells that operate below 300° C. However, in order to move to fuel cell operation at intermediate temperatures, it is necessary to have electrolyte materials that exhibit proton conductivities of at least $10^{-2}$ S/cm or greater at these temperatures and under conditions not requiring artificial humidification.

A number of solid-acids and coordination polymers have previously been reported as intermediate temperature fuel cell electrolytes, but nearly all of these are highly temperature limited for their optimum performance. The solid-acid family of electrolytes which include $AHSO_4$ and $AH_2PO_4$ (A=Na, K, Rb, Cs, $NH_4$) do not exhibit adequate proton conductivity below a so-called superprotonic transition (occurring ~200-230° C.) and have a limited operational window thereafter because of dehydration and/or melting around 240-250° C. Usage of these materials in a fuel cell device requires significant startup time to reach the optimum temperature along with carefully monitored/controlled hydration of the membrane. Of the coordination polymers on which AC conductivity measurements have been performed, these materials generally do not show chemical stability above 200° C. Instability is due to either melting or decomposition into more condensed phases, limiting the operational temperature window (~150-200° C.). Questionable long-term stability further hampers the use of coordination polymers as electrolytes in hydrogen fuel cells.

A need exists for proton-conducting materials with characteristics more suitable for use in intermediate temperature hydrogen fuel cells.

BRIEF SUMMARY

In one embodiment, an electrochemical device includes a borosulfate salt of a protic, Brønsted base, for example $NH_4[B(SO_4)_2]$ operable as a proton-conducting separator membrane and/or electrode, wherein the electrochemical device is selected from the group consisting of hydrogen fuel cells, flow batteries, and electrolyzers.

In another embodiment, a borosulfate salt of a protic, Brønsted base is formed into an electrode that further comprises comprising Pt and carbon.

In further embodiments, a flow battery incorporates a borosulfate salt of a protic, Brønsted base as a proton-conductor. For example, a flow battery might comprise a first half-cell comprising an anolyte; a second half-cell comprising a catholyte; and a membrane comprising $NH_4[B(SO_4)_2]$, wherein the membrane separates the two half-cells and operates to conduct protons therebetween.

DETAILED DESCRIPTION

Definitions

Figure 1:
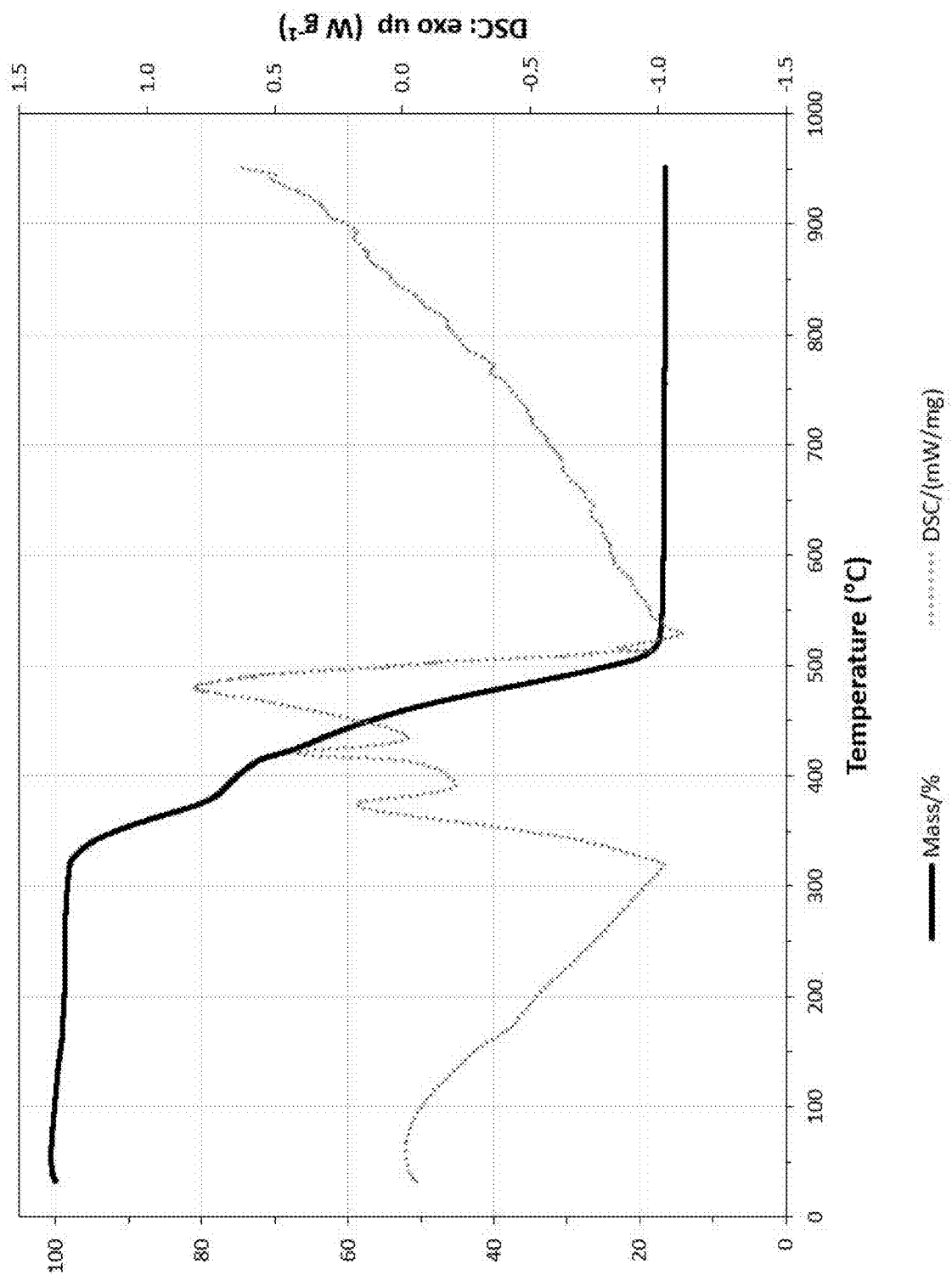
FIG. 1 shows results of thermogravimetric analysis (solid black line) and differential scanning calorimetry (dotted green line) of $NH_4(B[SO_4]_2)$ run at 10 K min$^{-1}$ under air, showing three-stage mass loss above 300° C.
Figure 2:
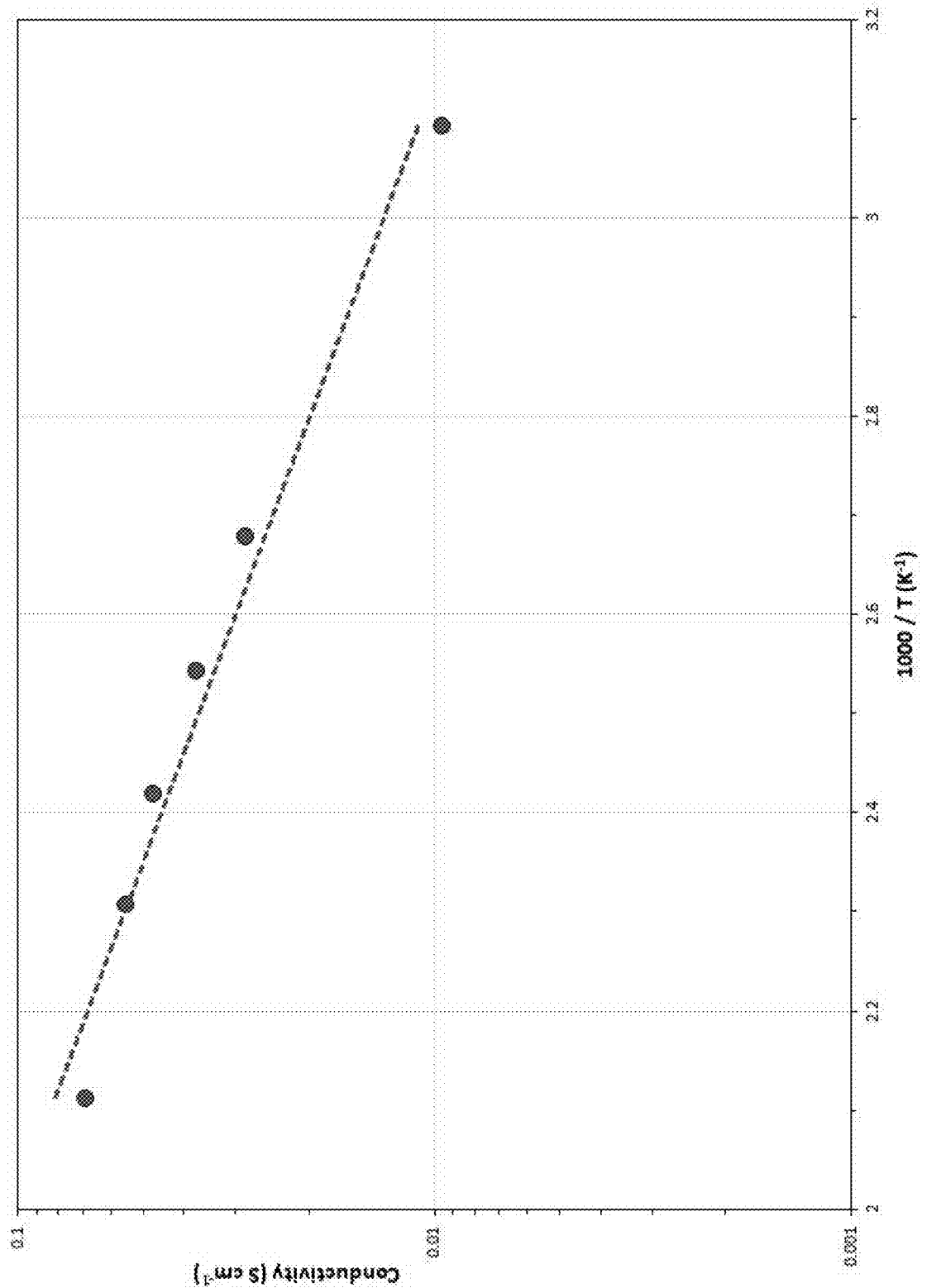
FIG. 2 provides a plot of calculated conductivity for an ammonium borosulfate disc on cooling from 200° C. to 50° C. under air in a convection oven. Black dashed line is fit to an Arrhenius conductivity model, where conduction is a process involving an activation energy for ion hopping.
Figure 3:
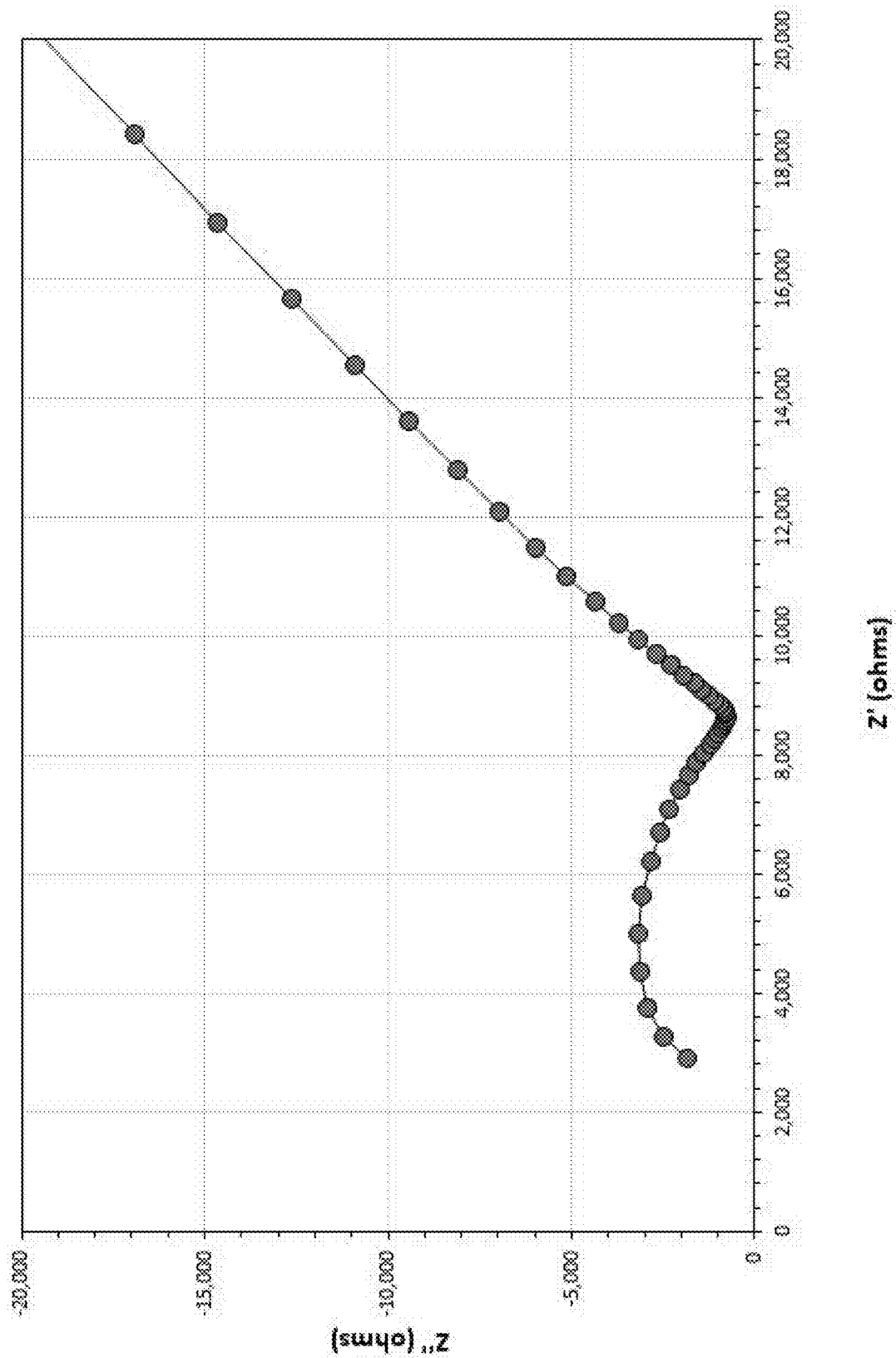
FIG. 3 displays a characteristic Nyquist plot of imaginary (capacitive) vs. real (resistive) impedance for a borosulfate disc, used to calculate conductivity. Semicircle+line spectrum shape demonstrates ionic, rather than electronic, conduction.

Before describing the present invention in detail, it is to be understood that the terminology used in the specification is for the purpose of describing particular embodiments, and is not necessarily intended to be limiting. Although many methods, structures and materials similar, modified, or equivalent to those described herein can be used in the practice of the present invention without undue experimentation, the preferred methods, structures and materials are described herein. In describing and claiming the present invention, the following terminology will be used in accordance with the definitions set out below.

As used herein, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

Overview

Described herein the is preparation of the borosulfate compound $NH_4[B(SO_4)_2]$ and its fabrication into a nonporous, monolithic solid electrolyte for use in electrochemical devices such as hydrogen fuel cells, flow batteries, and electrolyzers, where these are operable at intermediate temperatures.

$NH_4[B(SO_4)_2]$ is a member of the recently discovered class of materials referred to as borosulfates (i.e. containing the $B(SO_4)_x$ moiety). Nearly all of these compounds are extremely sensitive to moisture, ($NH_4[B(SO_4)_2]$ being a notable exception) and thus their physical properties have been heretofore poorly explored. $NH_4[B(SO_4)_2]$ as a compound was reported by Daub, Hoppe, and Hillebrecht [Z. Anorg. Allg. Chem. 2014, 640 (14), 2914-2921], describing a synthesis of the compound and its crystal structure.

The present inventors realized that the structure of $NH_4[B(SO_4)_2]$ displays a number of desirable features for proton conduction, including: hydrogen bonding interactions; an infinite proton-hopping pathway; and non-labile sulfate anions via a 1D coordination polymer with boron bridges. Accordingly, $NH_4[B(SO_4)_2]$ was investigated as a potential proton conducting electrolyte material for use in electrochemical devices.

Electrochemical Devices

Proton exchange membrane hydrogen fuel cells (not to be conflated with polymer electrolyte membrane fuel cells) use a proton conducting electrolyte material. Generally, fuel cells function on the principle of having the anode and cathode separated by an ion exchange membrane that conducts the complementary ion necessary to complete the half reaction at the opposite electrode from where this ion is generated. This means the device geometry involves the two electrodes being separated by an electrically insulating and ion-conducting membrane that contains the electrolyte material. Also, each electrode has an electrocatalytically active interface with the membrane that can be called a "catalyst later", which is a thin, porous layer where each electrode half reaction occurs. The electrolyte material is an integral part of this thin catalyst layer, because it conducts the ion that is generated on one side of the fuel cell, and consumed on the other side. In the case of borosulfate proton conductors, the relevant borosulfate can be used in both electrode electrocatalyst layers, as well as the separator membrane.

Proton exchange electrolyzer are also contemplated. An electrolyzer is essentially reversed fuel cell. As a relevant example, a hydrogen fuel cell running on a borosulfate-based electrolyte is a device that uses hydrogen as fuel, and via its oxidation with oxygen from the air, produces electricity and water. An electrolyzer based on the same technology would take in water, and would split that water into hydrogen and oxygen and in the process it would be powered by electricity. Hence, the overall device architecture would be essentially the same as a hydrogen fuel cell, it would just be running in reverse.

Flow batteries use two flowable reactants that have a redox couple for each half reaction, with electrodes inserted into the reactants, and with a membrane separator that prevents the two from mixing, only allowing the ion of interest to cross over. In this configuration the electrodes are not in direct contact with the membrane separator. For such a device, a borosulfate electrolyte may be used just as a component of the membrane separator for the transfer of protons from one half cell to the other; or it may also be employed in the electrodes for improved proton conductivity within the electrode materials.

EXAMPLES

Ammonium Borosulfate, $NH_4[B(SO_4)_2]$, as a Proton Conductor

Clear needle-like prisms of $NH_4[B(SO_4)_2]$ were prepared by the method of Daub, Hoppe, and Hillebrecht [Z. Anorg. Allg. Chem. 2014, 640 (14), 2914-2921]. The methodology involves mixing 0.70 g (5.3 mmol) $(NH_4)_2SO_4$ and 0.64 g (10.3 mmol) $B(OH)_3$ followed by addition of 10 mL of 65% Oleum in a 20 mL scintillation vial. The samples were covered with a watch glass and allowed to sit for a period of one week. After one week, crystals of both $NH_4[B(S_2O_7)_2]$ and $NH_4[B(SO_4)_2]$ precipitated from solution. The precipitate was decanted from the mother liquor and heated at 573 K in air to remove residual sulfuric acid and give better crystallization. Heating also likely helps to remove the moisture sensitive $NH_4[B(S_2O_7)_2]$, which upon heating loses two equivalents of $SO_3$ and recrystallizes as additional $NH_4[B(SO_4)_2]$. The identity of the sample as $NH_4[B(SO_4)_2]$ was confirmed using both powder and single-crystal X-ray diffraction (PXRD and SCXRD).

Sintered discs of $NH_4[B(SO_4)_2]$ were prepared using a Carver press equipped with resistively heated platens. Samples (0.300 g) were loaded in a ½" diameter die and pressed to ~7500 lbs. (~260 MPa) of uniaxial pressure. The platens were then heated to 523 K, during which the applied force increased to ~9000 lbs. The sample was held at this pressure and temperature for 30 minutes and then recovered. PXRD of the recovered discs gives the expected pattern for $NH_4[B(SO_4)_2]$. The recovered discs ranged in thickness from 0.035" to 0.040" (0.90 to 1.00 mm).

Thermal gravimetric analysis (TGA) of $NH_4[B(SO_4)_2]$ did not reveal any sample evolution below 300° C., as seen in FIG. 1. Decomposition of the sample began at ~330° C., losing about 20% of the sample mass from 330-380° C. A second loss step began at ~400° C., leading to a loss of a further 60% of the mass up to ~500° C., whereupon no other phase changes were observed. It is evident that the sample is highly stable up to 300° C., based upon the drying temperature for recrystallization and the TGA experiments. This is expected to allow fuel cell performance up to 300° C., extending the temperature window compared to other, previously reported solid acid proton conducting electrolyte materials. A higher operational temperature can in turn enable the use of cheaper catalyst materials, as well as be advantageous for overall fuel cell performance.

Conductivity measurements by impedance spectroscopy over the frequency range of 1 MHz to 1 Hz were performed using a Solartron SI1287 electrochemical interface coupled to a model 1255 frequency response analyzer. An as-prepared, sintered disc of $NH_4[B(SO_4)_2]$ (13 mm diameter) was placed between two flat, disc-shaped stainless steel electrodes (19 mm diameter) and held together with an insulating mechanical clip. The electrodes were attached to leads from the analyzer with silver epoxy. For high temperature measurements, the leads with the attached electrodes and sample were extended into a convection oven via a port in the top surface. Measurements were taken in increments up to 220° C.

Ionic conductivity measurements were performed at ambient humidity, which varied daily from 40-55% at 25° C. Although the humidity was not controlled inside the convection oven, the variance in ambient humidity makes a negligible difference in the atmospheric water content at temperatures above 100° C. All observed humidity conditions at 25° C. result in relative humidities below 0.15% at 200° C. due to the low partial pressure of saturated water vapor in air at 25° C. Initial impedance measurements of the as-prepared sintered disc gave an ionic conductivity on the order of $10^{-4}$ S/cm at 25° C. Upon heating the sample to 75° C., the measured conductivity of the sample initially decreased, likely due to a drop in relative humidity and an adverse change in the sample's hydration. Upon increasing temperature to 100° C., conductivity returned to $\sim 10^{-4}$ S/cm. Further heating in increments of 20° C. continued to improve the conductivity, reaching a maximum conductivity of $\sim 10^{-3}$ S/cm at 220° C., the temperature limit of the oven. At high temperature, the contribution to resistance from impedance of the connections cannot realistically be neglected, thus $10^{-3}$ S/cm is a low-end ionic conductivity estimate (assuming the electrical connections contribute negligible resistance).

$NH_4[B(SO_4)_2]$/Pt/Vulcan Carbon Electrodes

Electrodes impregnated with Pt catalysts were also prepared in order to test the viability of $NH_4[B(SO_4)_2]$ as an electrolyte for hydrogen fuel cell operation. A Pt colloid/Vulcan carbon mixture was prepared in a method similar to previous reports (J. Phys. Chem. Lett. 2010, 1, 1977-1981). 50 mL of Pt colloid ethylene glycol solution was precipitated with 0.1 M $HClO_4$ and allowed to settle for ~1-2 hours. The resulting suspension and flocculate were transferred to a $N_2$ flowbox and the liquid decanted. The precipitated Pt colloid was then transferred to a 100 mL round bottom flask and 0.75 g of vulcan carbon was added. The mixture was resuspended in ~50 mL of ethanol, capped, removed from the flowbox, and sonicated for 3 days. The resulting Pt/Vulcan carbon mixture was then decanted and washed with additional ethanol. The mixture was transferred to centrifuge tubes and centrifuged at 3000 rpm for 5 min. The mixture was decanted again and the Pt/Vulcan carbon was dried in a vacuum oven overnight (~50° C.).

In order to prepare electrodes that will adhere to prepared monolithic discs of $NH_4[B(SO_4)_2]$, the resulting Pt/Vulcan carbon mixture was mechanically mixed via mortar and pestle with crystals of $NH_4[B(SO_4)_2]$ in a mass ratio of 5:1. Upon grinding, crystals of $NH_4[B(SO_4)_2]$ tend to press into matted fibers. To ensure that the mixture is homogenous, the three component mixture was heated at 150° C. and ground further. After heating at 150° C. for 1-2 hours, the three component mixture changes morphology from a powdered solid to a viscous, spreadable, paste-like material. The paste-like mixture was then applied to and spread evenly onto both sides of prepared monolithic discs of $NH_4[B(SO_4)_2]$ to act as electrodes. The discs with applied electrodes were then dried in a vacuum oven at 50° C. overnight whereupon the electrode paste materials dried and were no longer sticky, giving a complete membrane electrode assembly (MEA).

Further Embodiments

It is contemplated that the $NH_4[B(SO_4)_2]$ electrolyte compound combined with a nanoscopic conducting carbon material and platinum nanoparticles would operate as a fuel cell electrode material. The mixture can be applied as a paste to surfaces and subsequently dried to produce a film that can catalyze both the anode and the cathode reactions for a hydrogen fuel cell, and therefore can be used as both an anode and a cathode for a hydrogen fuel cell. This same methodology is applicable to other electrolytes contemplated herein.

In place of, or in addition to, to the ammonium borosulfate described above, the use of borosulfate salts of other protic, Brønsted bases is contemplated. They include, but are not limited to, those illustrated in their neutral (i.e. conjugate base) forms in FIG. 4.

The non-ionic forms are depicted for simplicity, as many of the conjugate acids can exhibit variable extents and/or locations of protonation (e.g. melamine-$H^+$ or melamine-$H_2^{2+}$), resulting in differing stoichiometric ratios with respect to borosulfate ($B(SO_4)_2^-$).

Figure 4:
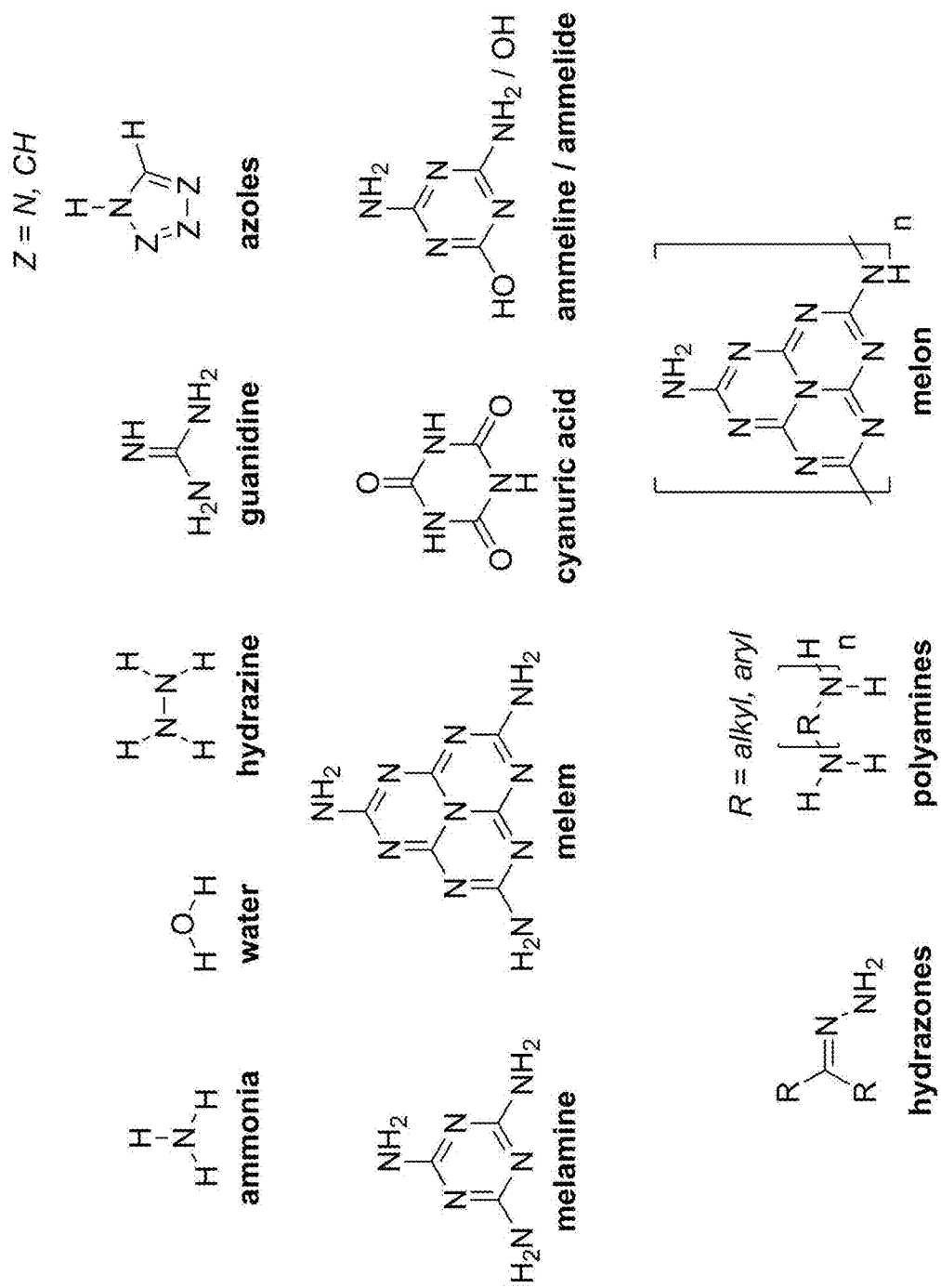
FIG. 4 depicts chemical structures of various protic, Brønsted conjugate bases that may serve as cations for proton-conducting borosulfates. Illustrated from left-to-right, top-to-bottom are: ammonia; water; hydrazine; guanidine; azoles (i.e. imidazole, pyrazole, triazole, tetrazole); melamine; melem; cyanuric acid; the partial hydrolysis products of melamine: ammeline and ammelide; hydrazones; polyamines; and melon (poly(melem)).

Not represented in FIG. 4, but also contemplated, are variants of these compounds whereby one or more N—H or C—H proton is substituted with an organic (alkyl or aryl) R-group, e.g. dimethylamine (($CH_3)_2NH$).

Borosulfate compounds containing mixtures of cations of the variety described above are further contemplated.

Moreover, other electrode materials that can be assembled in the same manner as described above with Vulcan carbon and Pt nanoparticles. The Pt catalyst used in the example might be substituted for another catalyst known or expected to perform the hydrogen oxidation reaction (HOR) and the oxygen reduction reaction (ORR). For instance, other metals (i.e. Ni, Co, Pd, etc.) and metal compounds (WC, Pt, and Pd alloys, etc.) are known to catalyze such reactions at the hydrogen fuel cell electrodes. Generally, the use of various pure and mixed nanoparticle metal and metal compound catalysts for ammonium borosulfate fuel cell use is contemplated.

By the same token, the graphitic carbon current collector in the electrodes does not have to be Vulcan carbon. Other graphitic carbons or robust, electrically conducting, and sufficiently high surface area materials are expected to operate similarly to help form a workable electrode paste, such as acetylene black, or Ketjenblack, etc.

The borosulfate material class can be used for a variety of electrochemical devices (beyond hydrogen fuel cells) employing a proton conducting separator, such as flow batteries for large-scale energy storage, or electrolyzers for the production of $H_2$ from feedstock chemicals such as water or ammonia. The material can be useful not just for hydrogen-oxygen reactions, but other redox couples that involve the flow of protons between the half reactions of the two device half-cells. Types of existing flow batteries where our material could be used include, but are not limited to, metal hydride/proton flow batteries, hybrid flow batteries, redox flow batteries, semi-solid and solid dispersion flow batteries, among others.

In broad terms, contemplated herein are borosulfate salts of protic, Brønsted bases serving as proton conductors in a fuel cell, and optionally as a component of an electrode therein.

Advantages $NH_4[B(SO_4)_2]$ exhibits ionic conductivity at magnitudes—measured by AC impedance and dielectric relaxation spectroscopies—similar to or exceeding previously reported solid acid and/or coordination polymer electrolytes. Unlike other solid acid electrolytes, $NH_4[B(SO_4)_2]$ does not require additional humidification to maintain conductivity at an increased operating temperature window. It seems plausible that the magnitude of ionic conductivity observed under ambient conditions could allow for use in a fuel cell at these temperatures, allowing for zero startup time, a significant improvement over other solid acids, which must first undergo a superprotonic transition. The stability of $NH_4[B(SO_4)_2]$ up to 300° C. extends the operation temperature window above that of known solid acid materials. Operation at such elevated temperatures could allow for lower catalyst loadings/usage of cheaper catalyst materials altogether, as well as allowing for hydrogen-powered fuel cells utilizing a proton conducing electrolyte to be operated at temperatures approaching 300° C., which would represent a significant technological advancement.

Concluding Remarks

All documents mentioned herein are hereby incorporated by reference for the purpose of disclosing and describing the particular materials and methodologies for which the document was cited.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

What is claimed is:

1. An electrochemical device comprising:
a proton-conducting borosulfate salt of a protic, Brønsted base configured as a separator membrane and/or electrode of the electrochemical device,
wherein the electrochemical device is selected from the group consisting of hydrogen fuel cells, flow batteries, and electrolyzers.

2. The electrochemical device of claim 1, wherein the protic, Brønsted base is selected from the group consisting of ammonia; water; hydrazine; guanidine; azoles; melamine; melem; cyanuric acid; the partial hydrolysis products of melamine: ammeline and ammelide; hydrazones; polyamines; and melon (poly(melem)).

3. The electrochemical device of claim 1, wherein the borosulfate salt of the protic, Brønsted base is $NH_4[B(SO_4)_2]$.

4. The electrochemical device of claim 1, wherein the borosulfate salt of the protic, Brønsted base combined with as a catalyst and graphitic carbon to form the electrode of the electrochemical device.

5. The electrochemical device of claim 1, being operable at temperatures ranging from about 150 to about 300° C.

6. The electrochemical device of claim 1,
wherein the electrochemical device is the flow battery; and
wherein the flow battery comprises a first half cell comprising an anolyte; a second half cell comprising a catholyte; and a membrane comprising a borosulfate salt of a protic, Brønsted base, wherein the membrane separates the two half cells and is operable to conduct protons therebetween.

7. The electrochemical device of claim 6, wherein the protic, Brønsted base is selected from the group consisting of ammonia; water; hydrazine; guanidine; azoles; melamine; melem; cyanuric acid; the partial hydrolysis products of melamine: ammeline and ammelide; hydrazones; polyamines; and melon (poly(melem)).

8. The electrochemical device of claim 7, wherein the borosulfate salt of the protic, Brønsted base is $NH_4[B(SO_4)_2]$.

9. The electrochemical device of claim 6, being operable at temperatures ranging from about 150 to about 300° C.

10. An electrochemical device comprising:
$NH_4[B(SO_4)_2]$ configured as a proton-conducting separator membrane and/or electrode of the electrochemical device,
wherein the electrochemical device is selected from the group consisting of hydrogen fuel cells, flow batteries, and electrolyzers.

11. The electrochemical device of claim 10, wherein the electrochemical device is a proton exchange membrane hybrid fuel cell comprising two electrocatalyst layers (including said electrode) and the separator membrane, each of which comprises the $NH_4[B(SO_4)_2]$.

12. The hydrogen fuel cell of claim 10, being operable at temperatures ranging from about 150 to about 300° C.

* * * * *